United States Patent
Park

(10) Patent No.: US 10,211,678 B2
(45) Date of Patent: *Feb. 19, 2019

(54) WIRELESS CHARGING APPARATUS AND WIRELESS CHARGING METHOD

(71) Applicant: Samsung Electronics Co., Ltd., Gyeonggi-do (KR)

(72) Inventor: Sung-Bum Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,774

(22) Filed: Aug. 7, 2017

(65) Prior Publication Data

US 2017/0338688 A1    Nov. 23, 2017

Related U.S. Application Data

(63) Continuation of application No. 14/549,155, filed on Nov. 20, 2014, now Pat. No. 9,762,082.

(30) Foreign Application Priority Data

Nov. 20, 2013    (KR) .................. 10-2013-0141565

(51) Int. Cl.
*H02J 7/00*    (2006.01)
*H02J 50/00*    (2016.01)
*H02J 50/12*    (2016.01)
*H02J 50/80*    (2016.01)
*H02J 50/50*    (2016.01)
*H02J 5/00*    (2016.01)
(Continued)

(52) U.S. Cl.
CPC .............. *H02J 50/12* (2016.02); *H02J 5/005* (2013.01); *H02J 7/025* (2013.01); *H02J 7/04* (2013.01); *H02J 50/50* (2016.02); *H02J 50/80* (2016.02)

(58) Field of Classification Search
None
See application file for complete search history.

(56) References Cited

U.S. PATENT DOCUMENTS 4,783,799 A    11/1988    Maass
8,115,448 B2    2/2012    John
(Continued)

FOREIGN PATENT DOCUMENTS

CN    102611208    7/2012
EP    2 560 356    2/2013
(Continued)

OTHER PUBLICATIONS

Chinese Office Action dated Sep. 29, 2017 issued in counterpart applicaton No. 201480061731.5, 21 pages.
(Continued)

*Primary Examiner* — Leigh M Garbowski
(74) *Attorney, Agent, or Firm* — The Farrell Law Firm, P.C.

(57) ABSTRACT

A wireless charging apparatus and a wireless charging method are provided. The method includes selecting at least one of a wireless power reception mode and a wireless power transmission mode by a wireless charging apparatus, wirelessly receiving electric power when the wireless power reception mode is selected, and wirelessly transmitting electric power when the wireless power transmission mode is selected.

17 Claims, 8 Drawing Sheets

(51) Int. Cl.
*H02J 7/04* (2006.01)
*H02J 7/02* (2016.01)

(56) References Cited

U.S. PATENT DOCUMENTS

| | | |
|---|---|---|
| 8,159,364 B2 | 4/2012 | Zeine |
| 8,175,660 B2 * | 5/2012 | Porwal .................. H02J 7/025 455/573 |
| 8,686,685 B2 | 4/2014 | Moshfeghi |
| 9,006,934 B2 | 4/2015 | Kozakai |
| 9,272,630 B2 | 3/2016 | Kim |
| 9,306,635 B2 | 4/2016 | Kurs |
| 2005/0134213 A1 | 6/2005 | Takagi et al. |
| 2011/0156640 A1 | 6/2011 | Moshfeghl |
| 2011/0316334 A1 | 12/2011 | Shimokawa |
| 2012/0280650 A1 | 11/2012 | Kim |
| 2012/0293119 A1 | 11/2012 | Park et al. |
| 2012/0299390 A1 | 11/2012 | Kim et al. |
| 2013/0026981 A1 | 1/2013 | Van der Lee |
| 2013/0049484 A1 | 2/2013 | Weissentem et al. |
| 2013/0257360 A1 | 10/2013 | Singh |
| 2014/0132211 A1 | 5/2014 | Kim et al. |
| 2015/0229134 A1 | 8/2015 | Masacka |

FOREIGN PATENT DOCUMENTS

| | | |
|---|---|---|
| EP | 2 579 421 | 4/2013 |
| KR | 1020120128576 | 11/2012 |
| KR | 1020140060636 | 5/2014 |
| WO | WO 2013/035987 | 3/2013 |

OTHER PUBLICATIONS

European Search Report dated Jun. 7, 2017 issued in counterpart appilcaton No. 14863517.0-1804, 7 pages.
International Search Report dated Feb. 23, 2015 issued in counterpart application No. PCT/KR2014/011216, 9 pages.

* cited by examiner

WIRELESS CHARGING APPARATUS AND WIRELESS CHARGING METHOD

PRIORITY

This application is a Continuation of application Ser. No. 14/549,155, filed with the U.S. Patent and Trademark Office on Nov. 20, 2014, and claims priority under 35 U.S.C. § 119(a) to Korean Application Serial No. 10-2013-0141565 filed in the Korean Intellectual Property Office on Nov. 20, 2013, the entire content of which is incorporated herein by reference.

BACKGROUND

1. Field of Invention

The present invention relates generally to wireless charging technology.

2. Description of Related Art

Mobile terminals, such as a mobile phone, a Personal Digital Assistant (PDA) and the like, are driven with rechargeable batteries and the battery of the mobile terminal is charged through supplied electronic energy by using a separate charging apparatus. Typically, the charging apparatus and the battery have separate contact terminals at an exterior of each and are electrically connected with each other by contacting the contact terminals.

However, since the contact terminal outwardly protrudes in such a contact type charging scheme, the contact terminal is easily contaminated by foreign substances and thus battery charging is not correctly performed. Further, battery charging may also not be correctly performed in a case where the contact terminal is exposed to moisture.

Recently, a wireless charging or a non-contact charging technology has been developed and used for electronic devices to solve the above-mentioned problem.

Such a wireless charging technology employs wireless electric power transmission/reception, and corresponds to, for example, a system in which a battery can be automatically charged when a portable phone is not connected to a separate charging connector but instead, merely placed on a charging pad. The wireless charging technology is applied to a wireless electric toothbrush or a wireless electric razor and is well known to the public. Accordingly, a waterproof function can be improved since electronic products are wirelessly charged through the wireless charging technology, and the portability of electronic devices can be increased since there is no need to provide a wired charging apparatus. Technologies related to the wireless charging technology are expected to be significantly developed in the coming age of electric cars.

The wireless charging technology includes an electromagnetic induction scheme using a coil, a resonance scheme using a resonance, and an RF/microwave radiation scheme converting electrical energy to a microwave and then transmitting the microwave.

It is considered up to now that the electromagnetic induction scheme is mainstream, but it is expected that the day will come in the near future when all electronic products are wirelessly charged, anytime and anywhere, on the strength of recent successful experiments for wirelessly transmitting power to a destination spaced away by dozens of meters through the use of microwaves at home and abroad.

A power transmission method through the electromagnetic induction corresponds to a scheme of transmitting electric power between a first coil and a second coil. When a magnet is moved in a coil, induction current is generated. By using the induction current, a magnetic field is generated at a transmission side, and electric current is induced according to a change of the magnetic field so as to make energy at a reception side. The phenomenon is referred to as magnetic induction, and the electric power transmission method using magnetic induction has high energy transmission efficiency.

The resonance method was released as a coupled mode theory, and uses a concept of physics in which if a tuning fork is rung, a wine glass near the turning fork is also rung at the same frequency. Electromagnetic wave containing electrical energy have also been made to resonate instead of making sounds resonate. The resonated electrical energy is directly transferred only when there is a device having a resonance frequency and parts of electrical energy which are not used are reabsorbed into an electromagnetic field instead of being spread in the air, so that the electrical energy does not affect surrounding machines or people unlike other electromagnetic waves.

In the wireless charging system according to the conventional art, a wireless power transmitter is fixedly installed at a site while externally receiving electric power to transmit electric power, but not to receive electric power. In addition, the wireless power transmitter according to the conventional art cannot be carried by the user, and cannot transmit electric power without an external power source.

SUMMARY

The present invention has been made to address at least the problems and disadvantages described above, and to provide at least the advantages described below.

Accordingly, an aspect of the present invention is to provide a wireless charging apparatus using the wireless power transmission technology.

Accordingly, another aspect of the present invention is to provide a wireless charging method and apparatus which can perform both wireless power transmission and wireless power reception and which can transmit and receive electric power while being carried by a user without using an external power source.

Accordingly, another aspect of the present invention is to provide a wireless charging apparatus which can not only transmit and receive electric power, but can also relay electric power between the wireless charging apparatus and another wireless charging apparatus, and which can charge another wireless charging apparatus when getting closer to the other wireless charging apparatus.

In accordance with an aspect of the present invention, a wireless charging method is provided that includes a selecting, by an electronic device, a wireless power reception mode based on a user's selection after selecting a wireless power transmission mode; wirelessly receiving power from a power transmitting device by connecting a power receiver of the electronic device to a resonator of the electronic device based on the wireless power reception mode being selected; and wirelessly transmitting power to a power receiving device by connecting a power transmitter of the electronic device to the resonator based on the wireless power transmission mode being selected.

In accordance with another aspect of the present invention, an electronic device is provided that includes a resonator, a power transceiver that includes a power transmitter and a power receiver, and a controller. The controller selects a power reception mode based on an user's selection after selecting a wireless power transmission mode; based on a power reception mode being selected, controls the power transceiver to wirelessly receive power from a power transmitting device by connecting the power receiver to the resonator; and based on a power transmission mode being selected, controls the power transceiver to wirelessly transmit power to a power receiving device by connecting the power transmitter to the resonator.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
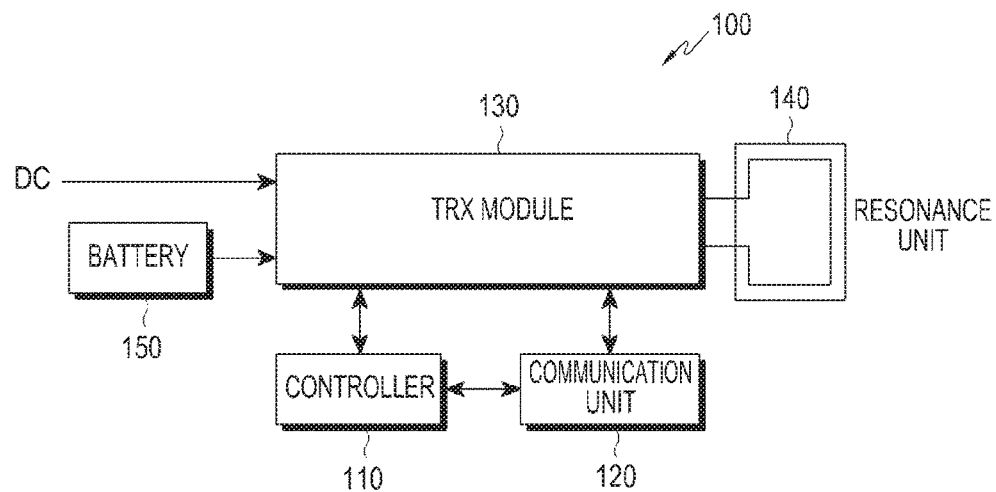
FIG. 1 is a block diagram illustrating a concept view of a wireless charging apparatus, according to an embodiment of the present invention.

Hereinafter, various embodiments of the present invention will be described in more detail with reference to the accompanying drawings. It should be noted that the same components of the drawings are designated by the same reference numeral throughout. In the following description of the present invention, a detailed description of known functions and configurations will be omitted when it may make the subject matter of the present invention unclear.

According to an embodiment of the present invention, a wireless charging apparatus selectively performs wireless power transmission, wireless power reception, and wireless power relay, is implemented by a device such as a wireless charging pad or a wireless charging terminal, and selectively receives external power, for example, external DC power, to selectively perform wireless power transmission, wireless power reception, and wireless power relay or receives electric power from a battery to selectively perform wireless power transmission, wireless power reception, and wireless power relay.

FIG. 1 is a block diagram illustrating a concept view of a wireless charging apparatus, according to an embodiment of the present invention.

Referring to FIG. 1, the wireless charging apparatus 100 includes a controller 110, a communication unit 120, a transceiver (TRX) module 130, a resonance unit 140, and a battery 150.

The controller 110 controls an overall operation of the electronic device 100. For example, the controller 110 controls the overall operation of the wireless charging apparatus 100 by using an algorithm, a program, or an application, required for the control, read from a storage unit. The controller 110 is implemented in a form of a Central Processing Unit (CPU), a microprocessor, or a mini computer.

According to the embodiment of the present invention, the controller 110 makes a control to selectively perform wireless power reception, wireless power relay, and wireless power transmission. When wireless power reception is selected, the controller 110 makes a control to receive wireless electric power through the TRX module 130. When wireless power relay is selected, the controller 110 makes a control to relay wireless electric power through the TRX module 130. When wireless power transmission is selected, the controller 110 makes a control to transmit wireless electric power through the TRX module 130. The controller 110 determines whether electric power is to be wirelessly transmitted by using electric power supplied from an external power source (DC) or is to be wirelessly transmitted by using electric power provided through a battery 150 when electric power is wirelessly transmitted.

The communication unit 120 performs communications with another wireless charging apparatus, a wireless power transmitter, or a wireless power receiver through a predetermined method. The communication unit 120 performs communications with another wireless charging apparatus, a wireless power transmitter, or a wireless power receiver through Near Field Communication (NFC), ZigBee communication, infrared ray communication, visual ray communication, Bluetooth communication, or a Bluetooth Low Energy (BLE) method. The communication unit 120 may use a CSMA/CA algorithm. The above mentioned communication schemes are simply exemplary, and the scope of the present invention is not limited by a specific communication scheme which is performed by the communication unit 120.

The communication unit 120 transmits a signal for information of the wireless charging apparatus 100. When the wireless charging apparatus 100 performs wireless power reception, the communication unit 120 transmits a wireless power transmission request signal to another wireless charging apparatus or a wireless power transmitter located near the wireless charging apparatus of the present invention. When the wireless charging apparatus 100 performs wireless power relay, the communication unit 120 transmits a wireless power transmission request signal to another wireless charging apparatus, a wireless power transmitter or a wireless power receiver located near the wireless charging apparatus of the present invention. When the wireless charging apparatus 100 performs wireless power transmission, the communication unit 120 transmits a wireless power transmission request signal from another wireless charging apparatus or a wireless power transmitter located near the wireless charging apparatus of the present invention in response to a wireless power transmission request. Here, the communication unit 120 may unicast, multicast, or broadcast the signal.

The TRX module 130 is a wireless power transceiver. When the wireless charging apparatus 100 performs wireless power reception, the TRX module 130 resonates at the same frequency as that of another wireless charging apparatus transmitting wireless electric power or of a resonance unit of a wireless power transmitter of a transmission side through a resonance unit 140 to receive electric power transmitted from a wireless charging apparatus of a transmission side or a wireless power transmitter of a transmission side, and forwards the received electric power to the battery 150.

When the wireless charging apparatus 100 performs wireless power relay, the TRX module 130 stops wireless power reception or wireless power transmission to wirelessly relay electric power between the wireless charging apparatus 100 and another wireless charging apparatus, a wireless power transmitter, or a wireless power receiver located near the wireless charging apparatus 100 through the resonance unit 140.

When the wireless charging apparatus 100 performs wireless power transmission, the TRX module 130 transmits electric power in the form of an AC waveform or converts electric power from a DC form to an AC form, using an inverter to transmit the electric power in the form of an AC waveform. The TRX module 130 is implemented in the form in which the electric power is received from an external DC power source to be transmitted or the form in which the electric power is received from the battery 150 to be transmitted, or is implemented in the form of a power reception interface to receive electric power externally and supply the electric power to another component element. It will be appreciated by those skilled in the art that the TRX module 130 is not limited as long as it includes a unit for providing electric power in a predetermined AC waveform.

In addition, the TRX module 130 provides an AC waveform through the resonator 140, and may provide an AC waveform in the form of an electromagnetic field according to another embodiment of the present invention. When the TRX module 130 transmits electric power in an AC waveform through the resonator 140, an inductance L of a loop coil of the resonator 140 is changed. Meanwhile, it will be appreciated by those skilled in the art that the TRX module 130 may use any unit other than the resonator 140 as long as the unit can transmit and receive an electromagnetic wave.

The resonator 140 is a structure in the form of a coil, and may further include a capacitor unit configured by a LUMP type cap block.

The TRX module 130 and the communication unit 120 may have different pieces of hardware such that the wireless charging apparatus 100 performs communications in an out-band form. However, according to an embodiment of the present invention, the TRX module 130 and the communication unit 120 are implemented using one piece of hardware so that the wireless charging apparatus 100 performs communications in an in-band form.

The above-described wireless charging apparatus 100 transmits and receives various signals, and accordingly, a charging operation through wireless power transmission and reception is performed between wireless charging apparatuses, between a wireless charging apparatus and a wireless power receiver, or between a wireless charging apparatus and a wireless power transmitter.

Figure 2:
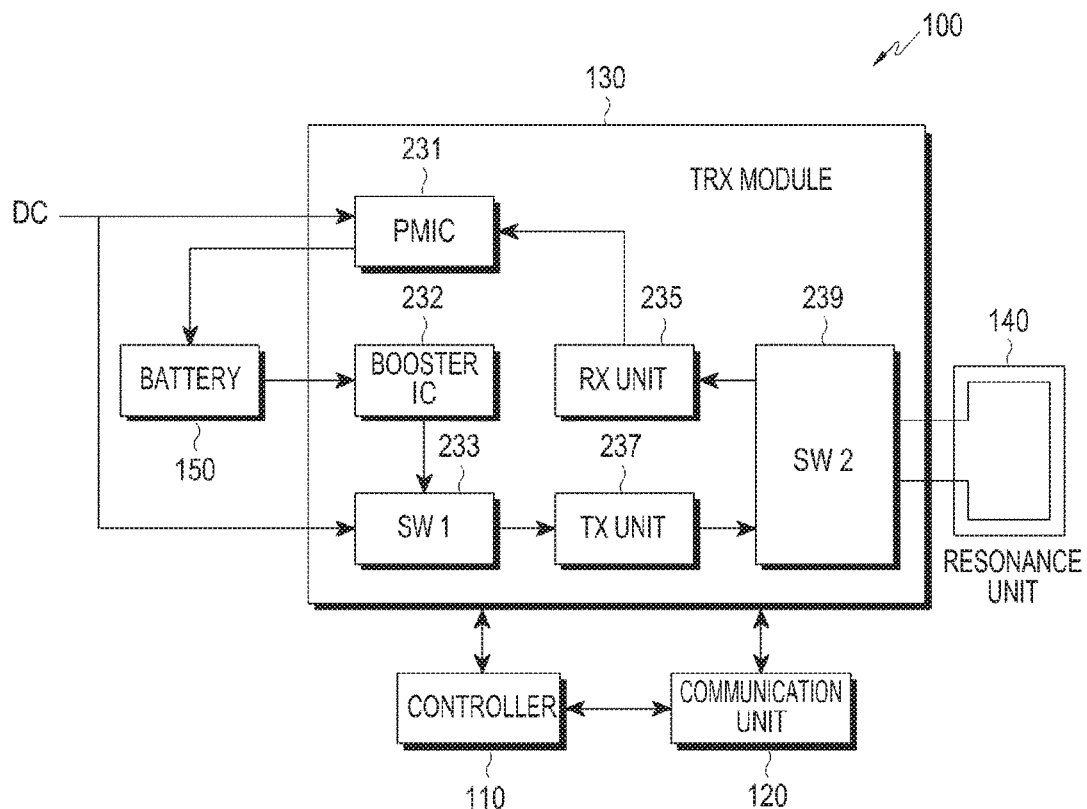
FIG. 2 is a detailed block diagram of a wireless power transceiver (TRX) module of a wireless charging apparatus, according to an embodiment of the present invention.

FIG. 2 is a detailed block diagram of a wireless power transceiver (TRX) module of a wireless charging apparatus, according to an embodiment of the present invention.

Referring to FIG. 2, the TRX module 130 includes a Power Management Integrated Circuit (PMIC) 231, a booster Integrated Circuit (IC) 232, a first switch (SW1) 233, an RX unit 235, a TX unit 237, and a second switch (SW2) 239.

The PMIC 231 manages electric power of the wireless charging apparatus. For example, if external electric power (DC) is applied to the PMIC 231, electric power is supplied to component elements of the wireless charging apparatus using the external electric power (DC) and the battery 250 is charged. The PMIC 231 receives electric power received from the RX unit 235 through the resonator 140, supplies electric power to the component elements of the wireless charging apparatus, and charges the battery 150.

When electric power is transmitted by using electric power of the battery 150, the booster IC 232 adjusts a voltage of the electric power supplied from the battery to a predetermined voltage to provide the predetermined voltage. For example, the booster IC 232 may raise a voltage of the electric power provided from the battery 150 to a voltage required for power transmission.

When the voltage of the battery is a voltage required for necessary electric power or higher, a buck converter IC may be used instead of the booster IC.

The SW1 233 performs a switching operation between the external power source DC, and the booster IC 232 and the TX unit 237. For example, the SW1 233 transmits electric power to the TX unit 237 when the wireless charging apparatus wirelessly transmits electric power, and interrupts transmission of electric power to the TX unit 237 when the wireless charging apparatus wirelessly relays electric power or wirelessly receives electric power. The SW1 233 transmits the electric power received from the external power source DC to the TX unit 237 when transmitting electric power to the TX unit 237, or transmits the electric power received from the battery 150 through the booster IC 232 to the TX unit 237.

The RX unit 235 is a wireless power receiver or may be in the form of a wireless power reception board. When the wireless charging apparatus 100 performs wireless power reception through the resonator 140, the RX unit 235 resonates at the same frequency as that of another wireless charging apparatus transmitting wireless electric power or of a resonance unit of a wireless power transmitter of a transmission side through a resonance unit 140 to receive electric power transmitted from a wireless charging apparatus of a transmission side or a wireless power transmitter of a transmission side.

The TX unit 237 is a wireless power transmitter or may be in the form of a wireless power transmission board. The wireless power transmission board includes a switch type power amplifier. When the wireless charging apparatus 100 performs wireless power transmission, the TX unit 237 transmits electric power in the form of an AC waveform or converts electric power from a DC form to an AC form using an inverter to transmit the electric power in the form of an AC waveform while supplying electric power in the form of a DC waveform. The TX unit 237 receives the electric power received from the external power source DC through the SW1 233 or transmits the electric power received from the battery 150 via the booster IC 232 through the resonator 140.

The SW2 239 performs a switching operation between the RX unit 235 and the TX unit 237, and the resonator 140. When the wireless charging apparatus wirelessly receives electric power, the SW2 239 connects the RX unit 235 and the resonator 140 and interrupts connection of the TX unit 237 and the resonator 140. When the wireless charging apparatus wirelessly relays electric power, the SW2 239 interrupts connection of the RX unit 235 and the resonator 140 and interrupts connection of the TX unit 237 and the resonator 140. When the wireless charging apparatus wirelessly transmits electric power, the SW2 239 interrupts connection of the RX unit 235 and the resonator 140 and connects the TX unit 237 and the resonator 140.

Figure 3:
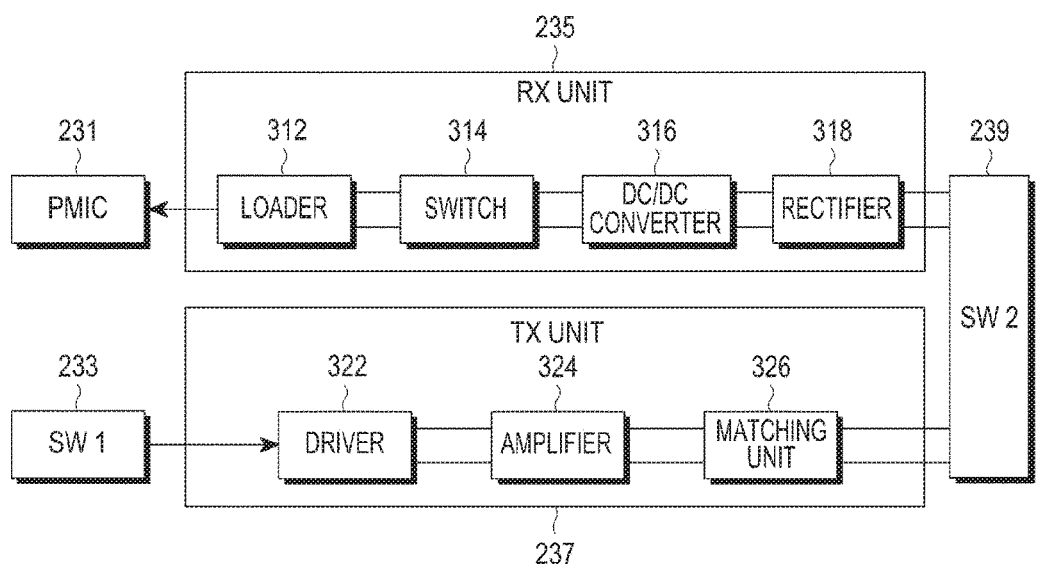
FIG. 3 is a block diagram of a wireless power receiver (RX) unit and a wireless power transmitter unit of a TRX module of a wireless charging apparatus, according to an embodiment of the present invention.

FIG. 3 is a block diagram of a wireless power receiver unit and a wireless transmitter unit according to the embodiment of the present invention.

Referring to FIG. 3, the RX unit 235 includes a rectifier 318, a DC/DC converter 316, a switch 314, and a loader 312. The rectifier 318 rectifies wireless AC power received from another wireless charging apparatus or from a wireless power transmitter into a DC form, and for example, may be implemented in the form of a bridge diode. The DC/DC converter 316 converts the rectified electric power into a preset gain. For example, the DC/DC converter 316 converts the rectified electric power such that an output voltage thereof becomes 5 V. The switch 314 connects the DC/DC converter 316 to the loader 312. The switch 314 maintains an on/off state under the control of the controller. When the switch 314 is in an on state, the loader 312 stores the converted electric power input from the DC/DC converter 316, and provides the stored electric power to the PMIC 231.

If a power storage unit is not necessary, the loader 312 may be removed.

The TX unit 237 includes a driver 322, an amplifier 324, and a matching unit 326. The driver 322 outputs DC electric power having a preset voltage value using the electric power provided from the SW1 233. The voltage value of the DC electric power output by the driver 322 is controlled by the controller 110 and the communication unit 120.

The DC current output from the driver 322 is output to the amplifier 324. The amplifier 324 amplifies the DC current with a preset gain. In addition, the DC electric power is converted into AC electric power based on a signal input from the controller and the communication unit. Accordingly, the amplifier 324 outputs AC electric power.

The matching unit 326 performs impedance matching such that the transmission power is transmitted to the reception side. For example, the matching unit 326 adjusts impedance viewed from the matching unit 326 and controls the output power to have high efficiency or high capacity.

The matching unit 326 adjusts impedance based on a control of the controller 110 and the communication unit 120. The matching unit 326 includes at least one of a coil and a capacitor. The controller 110 and the communication unit 120 controls a connection state with at least one of the coil and the capacitor, and accordingly, performs impedance matching. The matching unit 326 transmits transmission power through the resonator 140 connected via the SW2 239 according to impedance matching.

Hereinafter, an operation of the wireless charging apparatus 100 will be described as an example.

Figure 4:
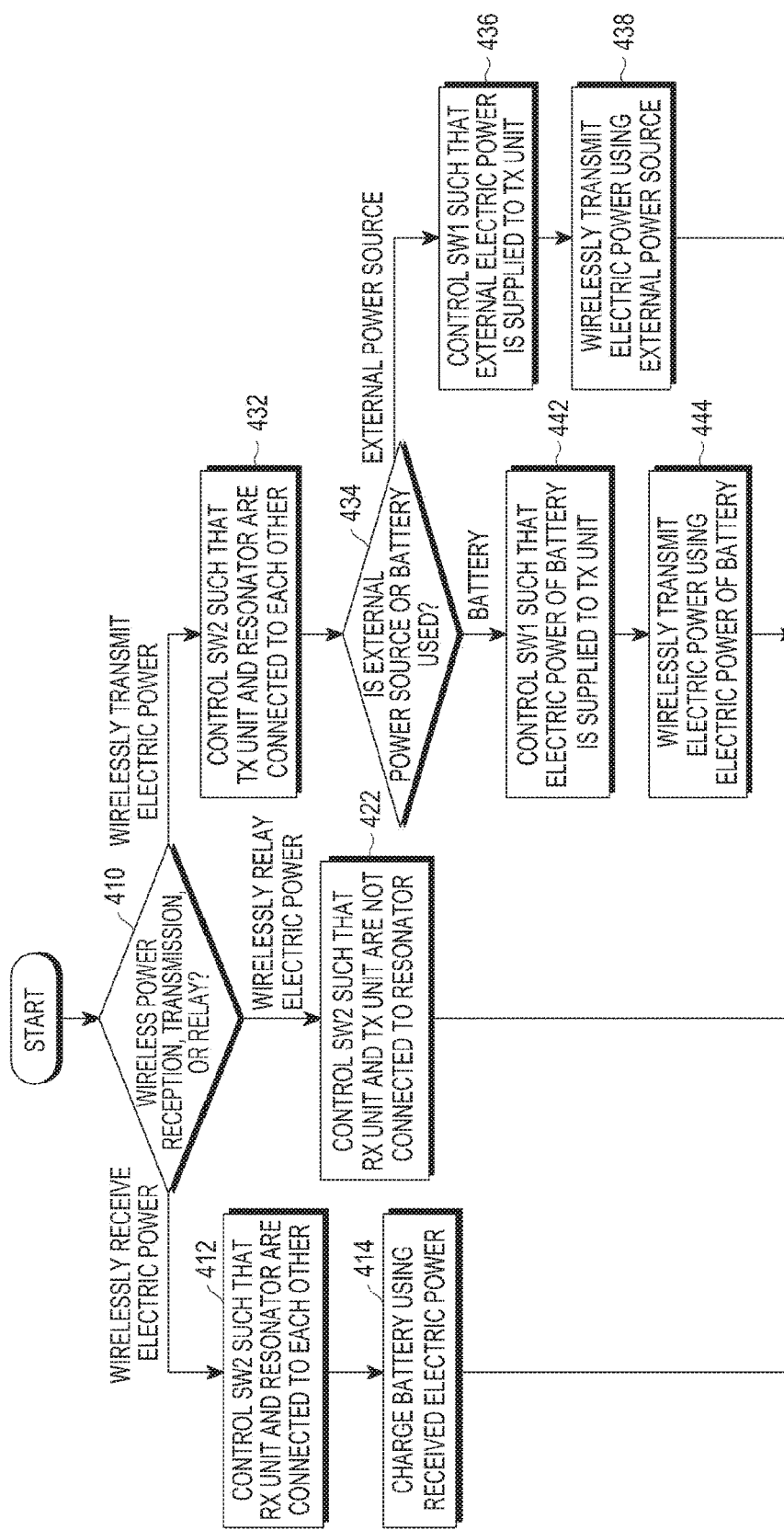
FIG. 4 is a flowchart of an operation of a wireless charging apparatus, according to an embodiment of the present invention.

FIG. 4 is a flowchart of an operation of a wireless charging apparatus, according to an embodiment of the present invention.

Referring to FIG. 4, the wireless charging apparatus 100 determines whether electric power is wirelessly received, transmitted, or relayed in step 410. For example, the wireless charging apparatus 100 may select a power transmission mode first, and then may select a power reception mode or a power relay mode, according to the situation. According to another embodiment of the present invention, any one of a power reception mode, a power relay mode, and a power transmission mode may be selected by the user, and any one of a power reception mode, a power relay mode, and a power transmission mode may be selected according to whether external DC power is applied or according to a battery residual power level.

When wireless reception of electric power is selected, the wireless charging apparatus 100 controls the SW2 239 such that the RX unit 235 and the resonator 140 are connected to each other in step 412. If the RX unit 235 and the resonator 140 are connected to each other, the wireless charging apparatus 100 receives electric power from another wireless charging apparatus or from a wireless power transmitter through the resonator 140. As the RX unit 235 and the resonator 140 are connected to each other, the wireless charging apparatus 100 charges the battery 150 using the electric power received in step 414.

When wireless relay of electric power is selected, the wireless charging apparatus 100 controls the SW2 239 such that the RX unit 235 and the TX unit 237 are not connected to the resonator 140 in step 422.

When wireless transmission of electric power is selected, the wireless charging apparatus 100 controls the SW2 239 such that the TX unit 237 and the resonator 140 are connected to each other in step 432. If the TX unit 237 and the resonator 140 are connected to each other, the wireless charging apparatus 100 transmits electric power to another wireless charging apparatus or to a wireless power transmitter through the resonator 140.

If the TX unit 237 and the resonator 140 are connected to each other, the wireless charging apparatus 100 determines whether electric power is to be transmitted using an external DC power source or using a battery in step 434. For example, the wireless charging apparatus 100 transmits electric power using the external DC power source when the external DC power source is provided, and transmits electric power using the battery 150 when the external DC power source is not provided. According to another embodiment of the present invention, it may be determined whether electric power is to be transmitted by using an external DC power source or by using a battery according to a selection of the user.

When electric power is transmitted by using the external DC power source, the wireless charging apparatus 100 controls the SW1 233 such that the external DC power source is connected to the TX unit 237 in step 436. If the external DC power source is connected to the TX unit 237, the wireless charging apparatus 100 transmits the electric power from the external DC power source to the TX unit 237. The wireless charging apparatus 100 wirelessly transmits electric power through the TX unit 237 by using the electric power of the external DC power source in step 438.

When electric power is transmitted by using the battery 150, the wireless charging apparatus 100 controls the SW1 233 such that the electric power of the battery 150 is supplied to the TX unit 237 in step 442. For example, the wireless charging apparatus 100 controls the SW1 233 such that the booster IC 232 for raising a voltage of the electric power provided from the battery 150 and the TX unit 237 are connected. If the booster IC 232 and the TX unit 237 are connected to each other, the electric power of the battery 150 is transmitted to the TX unit 237 via the booster IC 232.

The wireless charging apparatus 100 wirelessly transmits electric power through the TX unit 237 by using the electric power of the battery 150 in step 444.

The SW2 239 for wireless power reception, wireless power relay, and wireless power transmission of the wireless charging apparatus 100 is configured in various embodiments.

Figure 5:
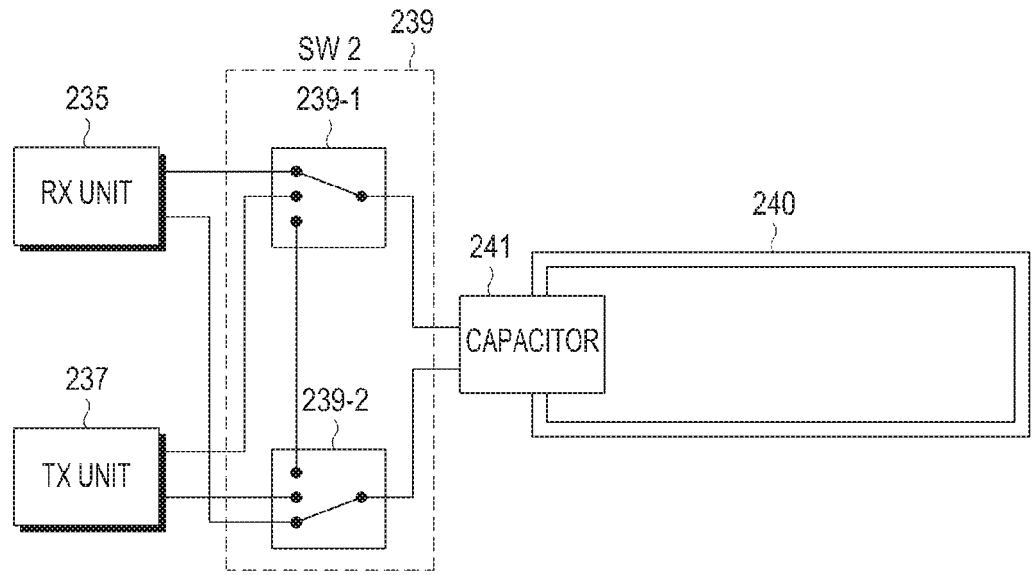
FIGS. 5 to 7 are block diagrams illustrating an example of a second switch of a TRX module of a wireless charging apparatus, according to an embodiment of the present invention.
Figure 6:
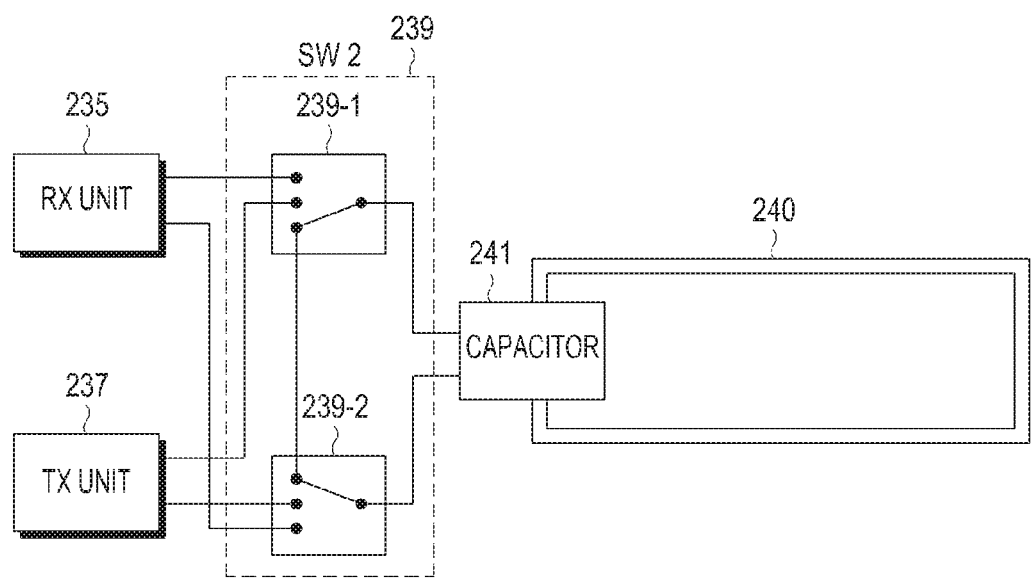
Figure 7:
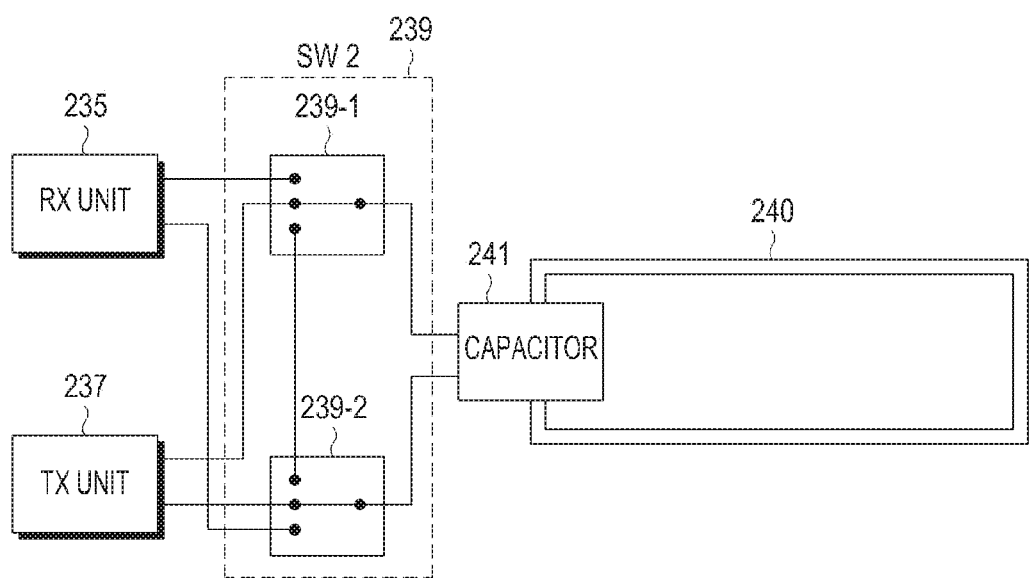

FIGS. 5 to 7 are block diagrams illustrating an example of a second switch of a TRX module of a wireless charging apparatus, according to an embodiment of the present invention.

Referring to FIGS. 5 to 7, the SW2 239 includes two switches 239-1 and 239-2. Each of the two switches 239-1 and 239-2 includes a first terminal connected to the RX unit 235, a second terminal connected to the TX unit 237, a third terminal connected to a corresponding third terminal of the other switch, and a fourth terminal connected to the resonator 240 via a capacitor 241.

Referring to FIG. 5, in each of the two switches 239-1 and 239-2 of the SW2 239, the first terminal and the fourth terminal are connected to each other when electric power is wirelessly received so that the RX unit 235 and the resonator 240 are connected to each other.

Referring to FIG. 6, when electric power is wirelessly relayed, the third terminals of the two switches 239-1 and 239-2 of the SW2 239 are connected to each other such that neither the RX unit 235 nor the TX unit 237 is connected to the resonator 240.

Referring to FIG. 7, in each of the two switches 239-1 and 239-2 of the SW2 239, the second terminal and the fourth terminal are connected to each other when electric power is wirelessly transmitted so that the TX unit 237 and the resonator 240 are connected to each other.

The capacitor 241 is further provided between the SW2 239 and the resonator 240. The capacitor 241 may be a combination of one or more serial capacitors and one or more parallel capacitors, and adjusts a resonance frequency of the resonator 240.

Additionally, the SW1 233, for determining whether an external DC power source is to be used or a battery 150 is to be used during a wireless power transmission operation of the wireless charging apparatus 100, is implemented in various embodiments.

Figure 8:
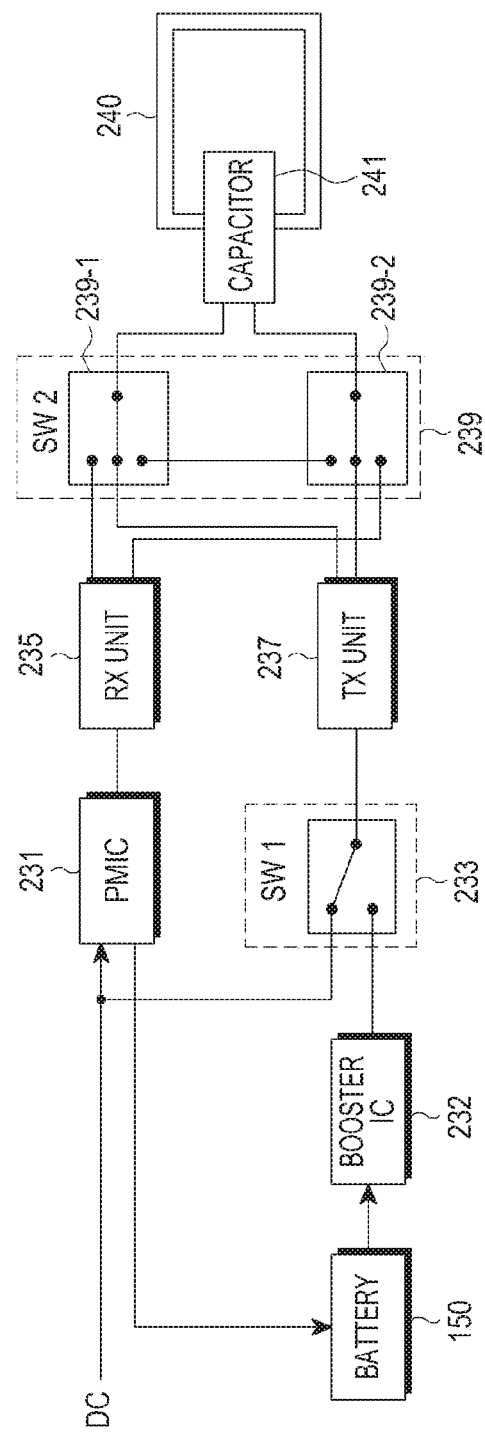
FIGS. 8 and 9 are block diagrams illustrating an example of a first switch of a TRX module of a wireless charging apparatus, according to an embodiment of the present invention.
Figure 9:
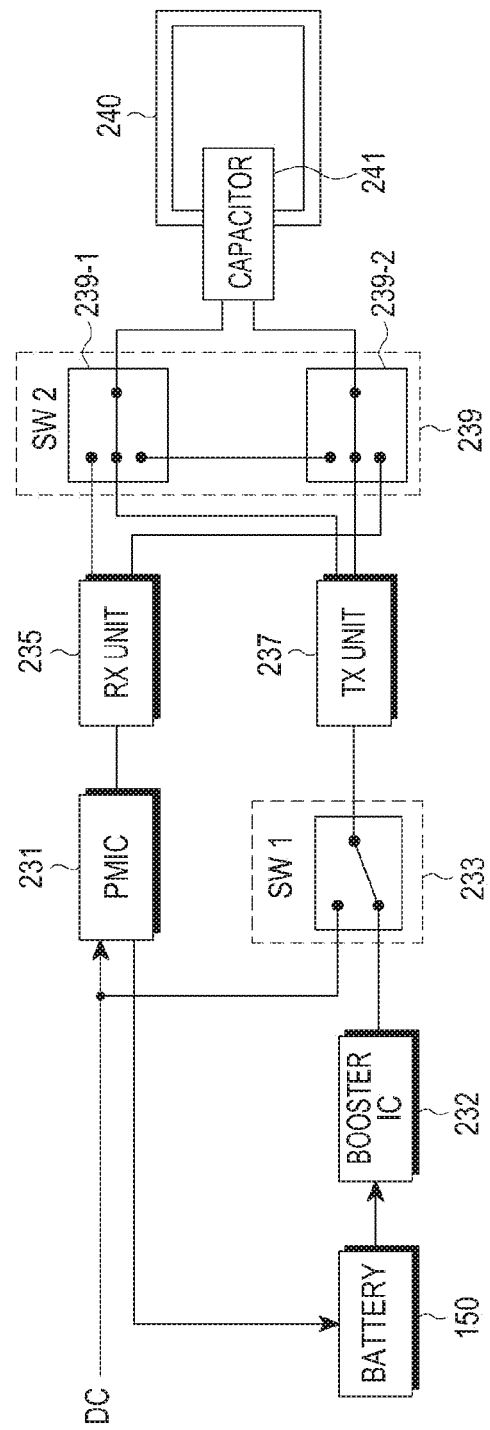

FIGS. 8 and 9 are block diagrams illustrating an example of a first switch of a TRX module of a wireless charging apparatus according to the embodiment of the present invention.

Referring to FIGS. 8 and 9, the SW1 232 includes a first terminal connected to the external DC power source, a second terminal connected to the booster IC 232, and a third terminal connected to the TX unit 240.

Referring to FIG. 8, when electric power is wirelessly transmitted by using the external DC power source, the SW1 233 connects the first terminal and the third terminal to supply the electric power of the external DC power source to the TX unit 237.

Referring to FIG. 9, when electric power is wirelessly transmitted by using the battery 150, the SW1 233 connects the first terminal and the third terminal to supply the electric power of the booster IC 232 to the TX unit 237.

Although not shown, the SW1 233 interrupts supply of electric power to the TX unit 237 when electric power is wirelessly relayed.

According to the embodiment of the present invention, a plurality of wireless charging apparatuses 100, which are configured as described above, charge each other as they get close to each other.

For example, when the wireless charging apparatus 100 receives electric power from an external DC power source, it acts as a master wireless charging apparatus to communicate at least one slave wireless charging apparatus nearby. Further, the master wireless charging apparatus may transmit electric power to at least one slave wireless charging apparatus nearby to charge the at least one slave wireless charging apparatus.

When there is provided a plurality of slave wireless charging apparatuses, the master wireless charging apparatus controls such that the slave wireless charging apparatuses receive electric power of the master wireless charging apparatus according to a predetermined condition.

For example, the predetermined condition may be any one of distances ("D", FIG. 10) between the master wireless charging apparatuses and the plurality of slave wireless charging apparatuses, remaining battery amounts of the plurality of slave wireless charging apparatuses, and a predetermined time interval.

The master wireless charging apparatus controls such that the highest level slave wireless charging apparatus is operated in a reception mode for receiving electric power according to a predetermined condition, and if the battery of the highest priority slave wireless charging apparatus is fully charged, the second highest priority slave wireless charging apparatus is operated in a reception mode for receiving electric power. Then, the slave wireless charging apparatus not operated in a reception mode are controlled to be operated in a relay mode for relaying electric power.

Figure 10:
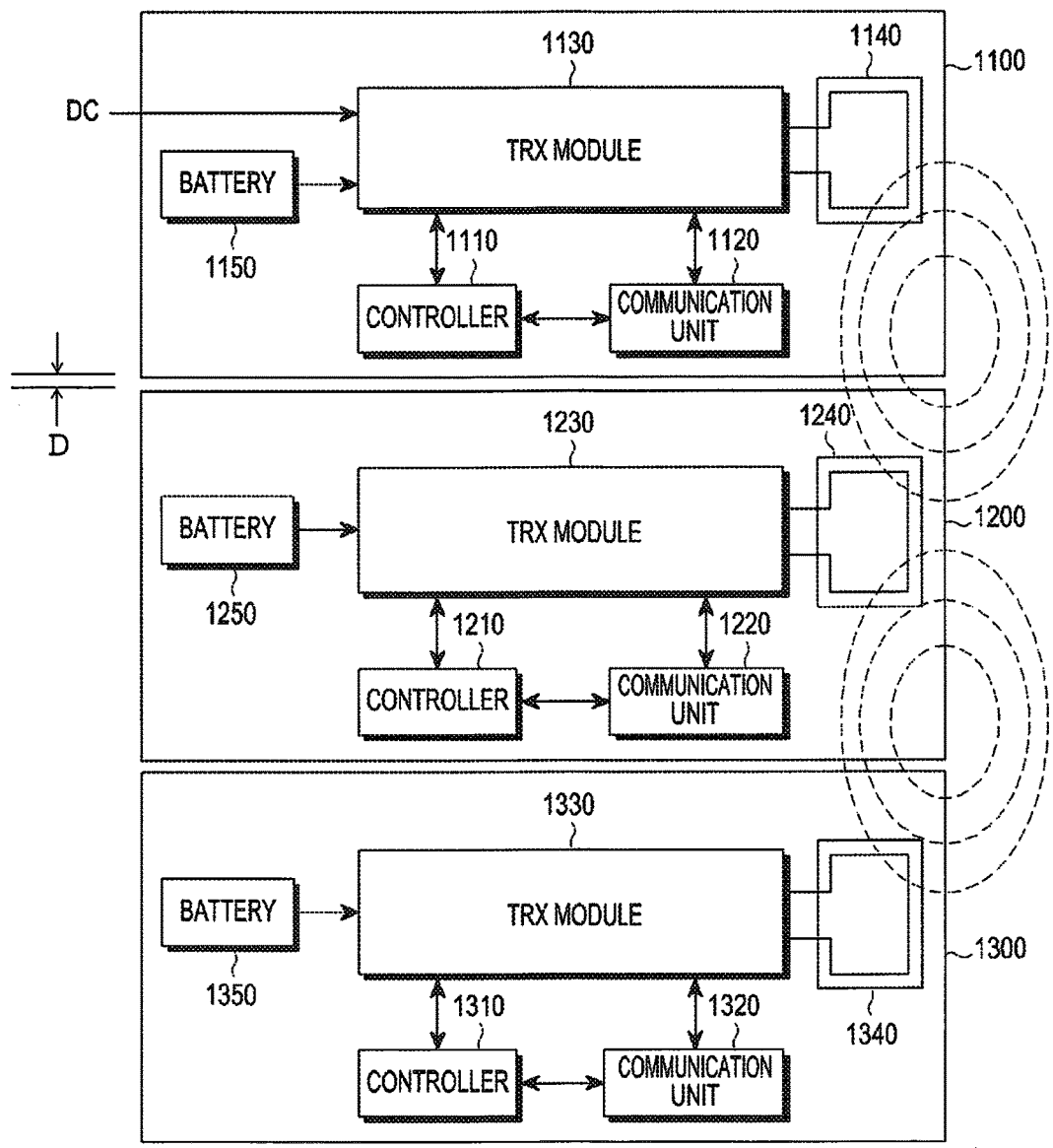
FIG. 10 is a block diagram illustrating a charging operation between a plurality of wireless charging apparatuses, according to an embodiment of the present invention.

FIG. 10 is a block diagram illustrating a charging operation between a plurality of wireless charging apparatuses, according to an embodiment of the present invention.

Referring to FIG. 10, when first, second and third wireless charging apparatuses 1100, 1200, and 1300 are sequentially stacked, the first to third wireless charging apparatuses 1100 to 1300 transmit and receive signals through the communication units 1120, 1220, and 1320, respectively. The first to third wireless charging apparatuses 1100 to 1300 exchange information, such as their charging state information (a battery residual lever and the like), information on whether electric power is to be received, relayed, or transmitted, and information on whether they receive electric power from the external power source DC, through the communication units 1120 to 1320, respectively. The wireless charging apparatus receiving electric power from the external DC power source is the master wireless charging apparatus 1100, and controls charging operations of the remaining wireless charging apparatuses 1200 and 1300.

For example, when the first wireless charging apparatus 1100 receives electric power from external DC power source, it acts as a master wireless charging apparatus. In this case, the controller 1110 of the first wireless charging apparatus 1100, through communications with the slave wireless charging apparatuses nearby, for example, the second wireless charging apparatus 1200 and the third charging apparatus 1300, controls the charging operations of the slave wireless charging apparatuses.

For example, the first wireless charging apparatus 1100 determines a charging order of the all of the wireless charging apparatuses 1100 to 1300 according to a predetermined condition.

According to an embodiment of the present invention, when the first wireless charging apparatus 1100 receiving external DC electric power is operated in a wireless power transmission mode, the first wireless charging apparatus 1100 allows a wireless charging apparatus with a remaining battery amount of which is the smallest, to be operated in a wireless power reception mode, and allows the remaining wireless charging apparatuses to be operated in a wireless power relay mode.

According to another embodiment of the present invention, when the first wireless charging apparatus 1100 receiving external DC electric power is operated in a wireless power transmission mode, the first wireless charging apparatus 1100 allows the second wireless charging apparatus 1200, closest to the first wireless charging apparatus 1100, to be operated in a reception mode first, and allows the third wireless charging apparatus 1300 to be operated in a relay mode. Then, if the second wireless charging apparatus 1200 is fully charged, the third wireless charging apparatus 1300 is operated in a reception mode and the second wireless charging apparatus 1200 is operated in a relay mode.

According to another embodiment of the present invention, when the first wireless charging apparatus 1100 receiving external DC power source is operated in a wireless power transmission mode, the remaining wireless charging apparatuses 1200 and 1300 perform charging operations while alternately performing a reception mode and a relay mode for a predetermined period of time.

Although it has been described in the embodiments of the present invention that the wireless charging apparatuses are stacked to charge each other, it will be appreciated that the wireless charging apparatuses may be disposed in various methods as long as wireless power transmission, reception, and relay are possible.

According to various embodiments of the present invention, wireless power reception, relay, and transmission can be selectively and conveniently performed by one wireless charging apparatus. Further, according to various embodiments of the present invention, because electric power can be supplied through a battery 150 in addition to an external DC power source, the user can conveniently perform wireless power reception, relay, and transmission while carrying the wireless charging apparatus.

Although various embodiments of the present invention have been illustrated and described, it will be appreciated by those skilled in the art that the embodiments of the present invention may be variously modified without departing from the spirit and the scope of the present invention as defined by the following claims and equivalents.

What is claimed is:

1. A control method of an electronic device comprising:
   wirelessly transmitting power to an external power receiving device by connecting a power transmitting circuit of the electronic device to a resonator of the electronic device based on a wireless power transmission mode;
   obtaining a wireless power reception mode selection input by the electronic device;
   switching from the wireless power transmission mode to the wireless power reception mode based on the obtained wireless power reception mode selection input while operating in the wireless power transmission mode;
   wirelessly receiving power from an external power transmitting device by connecting a power receiving circuit of the electronic device to the resonator of the electronic device based on the wireless reception mode;
   obtaining a wireless power relay mode selection input;
   switching from the wireless power transmission mode to a wireless power relay mode based on the obtained wireless power relay mode selection input while operating in the wireless power transmission mode; and
   wirelessly relaying power from the power transmitting device to the power receiving device by disconnecting both of the power transmitting circuit and the power receiving circuit from the resonator based on the wireless power relay mode.

2. The control method of claim 1, wherein wirelessly transmitting the power comprises:
   selecting one of an external power source and a battery of the electronic device, based on the wireless power transmission mode;
   receiving electric power from the external power source and wirelessly transmitting the power using the electric power being supplied from the external power source, based on the external power source being selected; and
   wirelessly transmitting the power using electric power supplied from the battery, based on the battery being selected.

3. The control method of claim 1, further comprising:
   when the electronic device receives electric power from an external power source, communicating with the power receiving device among a plurality external devices located around the electronic device; and
   wirelessly transmitting the power using the electric power supplied from the external power source to the external power receiving device to charge the external power receiving device.

4. The control method of claim 3, further comprising:
   causing the external power receiving device to wirelessly receive the power transmitted from the electronic device, based on a predetermined condition.

5. The control method of claim 4, wherein the predetermined condition is one of a distance between the electronic device and the external power receiving device, a remaining battery amount of the external power receiving device, and a predetermined time interval.

6. The control method of claim 4, further comprising:
   identifying a charging order of the plurality of external devices based on the predetermined condition, and
   causing one external device of the plurality of external devices to be the power receiving device to operate in a wireless power reception mode and another external device of the plurality of external devices to be the power transmitting device to operate in the wireless power relay mode based on the charging order.

7. An electronic device comprising:
   a resonator;
   a power transmitting circuit;
   a power receiving circuit; and
   a controller configured to:
      control the power transmitting circuit to wirelessly transmit power to an external power receiving device by connecting the power transmitting circuit to the resonator based on a wireless power transmission mode,
      obtain a wireless power reception mode selection input by the electronic device,
      switch from the wireless power transmission mode to the wireless power reception mode based on the obtained wireless power reception mode selection input while operating in the wireless power transmission mode,
      control the power receiving circuit to wirelessly receive power from an external power transmitting device by connecting the power receiving circuit of the electronic device to the resonator of the electronic device based on the wireless reception mode,
      obtain a wireless power relay mode selection input,
      switch from the wireless power transmission mode to a wireless power relay mode based on the obtained wireless power relay mode selection input while operating in the wireless power transmission mode, and
      wirelessly relay power from the power transmitting device to the power receiving device by disconnecting both of the power transmitting circuit and the power receiving circuit from the resonator of the electronic device based on the wireless power relay mode.

8. The electronic device of claim 7, further comprising:
   a first switch configured to:

based on the power reception mode, connect the power receiving circuit to the resonator of the electronic device, based on the wireless power transmission mode, connect the power transmitting circuit to the resonator of the electronic device, and based on the wireless power relay mode, disconnect both of the power receiving circuit and the power transmitting circuit from the resonator of the electronic device.

9. The electronic device of claim 8, further comprising:
a battery; and
a second switch configured to connect one of an external power source and the battery to the power transmitting circuit.

10. The electronic device of claim 9, further comprising a booster integrated circuit (IC), located between the battery and the second switch, configured to adjust a voltage of power provided from the battery to a predetermined value.

11. The electronic device of claim 9, further comprising a buck converter IC, located between the battery and the second switch, configured to adjust a voltage of power provided from the battery to a predetermined value.

12. The electronic device of claim 9, further comprising a Power Management IC (PMIC) configured to charge the battery with power received through the power receiving circuit.

13. The electronic device of claim 9, further comprising a booster Integrated Circuit (IC) configured to charge the battery with power received through the power receiving circuit.

14. The electronic device of claim 9, wherein, based on electric power from the external source being supplied to the electronic device, the controller is further configured to control the electronic device to wirelessly transmit power to the external power receiving device.

15. The electronic device of claim 14, wherein the controller is further configured to control the electronic device to wirelessly transmit power to the external power receiving device among a plurality of external devices based on a predetermined condition.

16. The electronic device of claim 15, wherein the predetermined condition is one of a distance between the electronic device and the external power receiving device, a remaining battery amount of the external power receiving device, and a predetermined time interval.

17. The electronic device of claim 15, wherein the controller is further configured to determine a charging order of the plurality of external devices, and cause one external device of the plurality of external devices to operate in the wireless power reception mode and another electronic device to operate in the wireless power relay mode based on the charging order.

* * * * *